United States Patent
Gorlich et al.

Patent Number: 5,120,335
Date of Patent: Jun. 9, 1992

[54] SEPARATOR TO SEPARATE PRODUCTS FINELY GROUND IN A MILL FROM A GAS CURRENT

[75] Inventors: Uwe Gorlich, Moers; Gunther Weyermanns, Kempen; Stefan Zerwas, Essen, all of Fed. Rep. of Germany

[73] Assignee: Messer Griesheim, Fed. Rep. of Germany

[21] Appl. No.: 699,189

[22] Filed: May 13, 1991

[30] Foreign Application Priority Data

May 15, 1990 [DE] Fed. Rep. of Germany ....... 4015511

[51] Int. Cl.[5] .............................................. B01D 45/16
[52] U.S. Cl. .......................................... 55/457; 55/429
[58] Field of Search ................... 55/207, 235-238, 55/429, 456, 457

[56] References Cited

U.S. PATENT DOCUMENTS 1,138,460  5/1915  Derby ................................. 55/236
4,179,273 12/1979  Montusi .............................. 55/457

Primary Examiner—Robert Spitzer
Attorney, Agent, or Firm—Connolly & Hutz

[57] ABSTRACT

A separator to separate products finely ground in a mill from a gas current consists of a housing which can be attached to the mill discharge site, having a tubular cylindrical insert which extends into the housing. The gas current is led into this tube and returned along its outer side. By sharply deflecting the gas current at the outlet of the tube, the product is separated and collected. In order to improve the efficiency of separation, the insert is designed so as to be formed by an inner tube and an outer tube, which form an annular space which serves to return the gas. A plate shapes the annular space as a spiral flow channel. There are slits in the outer tube located at the height of the bottom of the flow channel formed by the plate. As a result of centrifugal and inertial forces, through these slits, the particles which are still unseparated reach the space between the outer tube and the housing, and settle there.

4 Claims, 1 Drawing Sheet

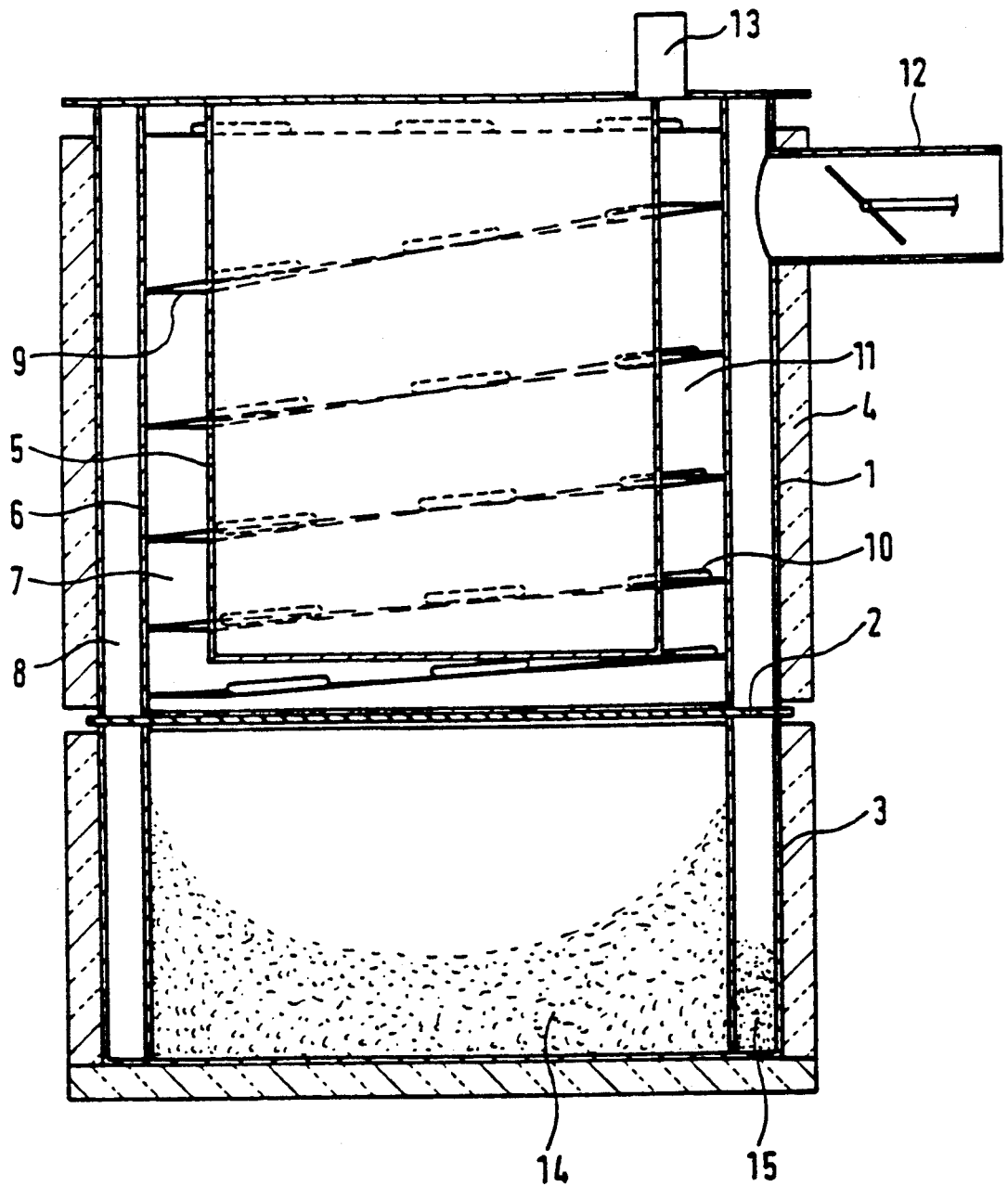

5,120,335

SEPARATOR TO SEPARATE PRODUCTS FINELY GROUND IN A MILL FROM A GAS CURRENT

BACKGROUND OF THE INVENTION

In many grinding procedures, in addition to the material to be ground, a gas current is also passed through the mill. The gas current serves either to convey or to cool the material to be ground. Regardless of the type of mill, after the grinding, the finely ground product must be separated from the gas current by means of a separator. Devices of various types are known for this purpose such as, for example, cyclones or sifters with rotating inserts. A simple separator which has proven its worth is based on the principles of allowing the gas current laden with the finely ground product in a housing to exit from a tubular insert and of returning the current along the outer side of the tubular insert. By sharply deflecting the gas current as it exits from the tubular insert, the finely ground product is separated from the gas current. Such a device is shown, for instance, in U.S. Pat. No. 4,579,288.

There are grinding procedures in which cooling is not only necessary during the grinding procedure, but rather, a low temperature also has to be maintained during the subsequent separation of the finely ground product and its storage. THis is the case, for example, with the grinding of biological substances whose cellular structure is disintegrated by the grinding. These biological substances, which are normally liquid, are first frozen by means of liquid nitrogen to form spherical pellets and subsequently ground at a temperature of, for instance, minus 70° C. [minus 94° F.]. This low temperature must be maintained since even a slight pressure stress already causes the product to thaw. This, in turn, leads to bridge formation and system closures. Grinding and storage at such a low temperature calls for a large volume of cooling gas. Due to economic considerations, this large volume of gas is recycled. This requires a thorough and almost complete separation of the finely ground product from the circulating gas current.

In this context, it has turned out that the separators having a sharp deflection of the gas current as it exits from a tubular insert—which are given preference due to their simplicity—are not completely satisfactory, since approximately 6 percent of the finely ground product still remains after the deflection of the gas current. Whereas such a level can be tolerated for many grinding procedures, it is not acceptable for costly products.

SUMMARY OF INVENTION

Therefore, the invention is based on the task of improving a separator having a sharp deflection of the gas current laden with the finely ground product at the outlet of a tubular insert to such an extent that almost complete separation of the product can be achieved.

In the separator according to the invention, the gas current which has been largely freed of product particles is not simply returned along the outer side of the tubular insert, but rather, it is fed into an annular space. There, a spiral flow is imparted to the gas current by means of a spiral flow channel. Preferably, the spirals have an increasing pitch. In this manner, the gas current is forced to have a high flow and rotational speed. The centrifugal and inertial forces which are exerted on the product particles which still remain unseparated are correspondingly high. Consequently, due to decreasing speed, increasing static pressure levels and constant pressure differential, these product particles leave the gas current through the slits situated along the lower outer edge of the spiral. Then these particles settle in the space between the outer tube and the housing, which is preferably also designed as an annular space. The gas current, now essentially free of the product, leaves the spiral and is returned once again to the product feed site of the mill.

THE DRAWING

The single FIGURE depicts a longitudinal section of a separator according to the invention, which can be attached underneath a mill discharge site.

DETAILED DESCRIPTION

The separator consists of a cylindrical housing 1, to which a replaceable pot 3 to collect the finely ground product is attached by means of a gasket 2. The housing 1 and the pot 3 are provided with insulation 4. In the housing 1, there is a tubular cylindrical insert, which essentially consists of an inner tube 5 and an outer tube 6. The inner tube 5 and the outer tube 6 form an annular space 7. In the same manner, an annular space 8 is formed between the outer tube 6 and the housing 1. The outer tube 6 extends all the way down to the bottom of the pot 3. A plate 9 shapes the annular space 7 into a spiral flow channel 11. The spirals have an increasing pitch. At the height of the bottom of the flow channel 11 formed by the plate 9, there are slits 10 in the outer tube 6. Furthermore, there is a discharge connecting piece 12 and a waste-gas connecting piece 13 in the upper section of the housing 1.

The operating method of the separator according to the invention will be described below. The gas current laden with the finely ground product enters the inner tube 5 from the top, flows through it and is deflected at the outlet end of this tube into the annular space 7. In this process, the majority of the product particles are separated and collected as product 14 in the middle of the pot 3. The gas current containing the remaining product particles not yet separated then flows at a very high speed through the spiral flow channel 11. Therefore, high centrifugal and inertial forces are exerted upon the product particles. Due to the increasing pitch of the spirals and the corresponding enlargement of the flow cross section of the spiral flow channel 11, the speed of the gas current decreases constantly. The static pressure increases proportionately. This, in turn, causes the product particles still contained in the gas current to reach the annular space 8 via the slits 10 and to settle as the residual product 15 in the outer section of the pot 3. Also via the slits 10, a small proportion of the gas current reaches the annular space 8, and this gas current is then removed via the discharge connecting piece 12 through a sifting bag. The main proportion, however, leaves the spiral flow channel 11 and is once again returned to the product feed site of the mill via the waste-gas connecting piece 13.

The effectiveness of the separator according to the invention is shown by the following test results which were obtained with pelleted and frozen sterilized milk (1.5% fat). In this process, the pellets to be ground were first placed into a serpentine cooler and subsequently into a pinned disk mill. A total of 23.2 kg of pelletized milk was placed into the serpentine cooler. A total of 20.5 kg was collected as product 14 and remaining product 15 in pot 3, while the remaining product 15 amounted to 0.79 kg. The gas current removed via the waste-gas connecting piece 13 was then fed into a cyclone and a sifting bag. In this process, an additional 0.15 kg of finely ground product was separated. Out of the total product particles still contained in the gas current and not yet separated (0.79 kg + 0.15 kg), a total of 0.79 kg was separated via the slits 10 and obtained as the product. This corresponds to a degree of separation of 84%. The remaining difference between the total product obtained (20.5 kg in pot 3 and 0.15 kg in the sifting bag) and the amount of 23.2 kg fed in, that is to say, 2.55 kg, refers to product losses, particularly in the mill and in the serpentine cooler.

What is claimed is:

1. In a separator to separate products finely ground in a mill from a gas current, consisting of a housing which is attached to the mill discharge site and having a tubular cylindrical insert which serves to deflect the gas current, the improvement being in that the insert is formed by an inner tube and an outer tube which together form an annular space, said space comprising means to return the gas, said space having a plate which forms a spiral flow channel and said flow channel having slits in said outer tube at the height of its bottom formed by said plate.

2. Separator according to claim 1, characterized by an increasing pitch of said spiral flow channel.

3. Separator according to claim 2, characterized in that said housing is cylindrical and forms a second annular space with said outer tube.

4. Separator according to claim 1, characterized in that said housing is cylindrical and forms a second annular space with said outer tube.

* * * * *